(12) United States Patent
Georgiadis (10) Patent No.: US 11,681,132 B2
(45) Date of Patent: Jun. 20, 2023

(54) PHASE MASK FOR STRUCTURED ILLUMINATION

(71) Applicant: THERMO ELECTRON SCIENTIFIC INSTRUMENTS LLC, Madison, WI (US)

(72) Inventor: Michael Georgiadis, Carlsbad, CA (US)

(73) Assignee: Thermo Electron Scientific Instruments LLC, Madison, WI (US)

( * ) Notice: Subject to any disclaimer, the term of this patent is extended or adjusted under 35 U.S.C. 154(b) by 117 days.

(21) Appl. No.: 17/176,719

(22) Filed: Feb. 16, 2021

(65) Prior Publication Data
US 2021/0255445 A1    Aug. 19, 2021

Related U.S. Application Data

(60) Provisional application No. 62/978,351, filed on Feb. 19, 2020.

(51) Int. Cl.
G02B 21/00    (2006.01)

(52) U.S. Cl.
CPC ..... *G02B 21/0032* (2013.01); *G02B 21/0056* (2013.01)

(58) Field of Classification Search
CPC .. G02B 21/0032; G02B 21/0056; G02B 5/30; G02B 5/3083; G02B 21/0068; G02B 21/0076; G02B 21/0092; G02B 21/06; G02B 21/14; G02B 21/36; G02B 27/28; G02B 27/50; G02B 27/52; G02B 26/06

USPC ....... 359/370, 362, 363, 368, 369, 385, 386, 359/387, 388, 389, 390, 483.01, 486.01, 359/486.03, 486.02, 489.01, 489.07
See application file for complete search history.

(56) References Cited

U.S. PATENT DOCUMENTS

| | | |
|---|---|---|
| 2,310,127 A | 2/1943 | Smith |
| 5,300,786 A | 4/1994 | Brunner et al. |
| 5,358,806 A | 10/1994 | Haraichi et al. |
| 5,362,584 A | 11/1994 | Brock et al. |
| 5,380,609 A | 1/1995 | Fujita et al. |
| 5,489,509 A | 2/1996 | Kawabata et al. |
| 5,561,009 A | 10/1996 | Mohri et al. |
| 5,777,342 A | 7/1998 | Baer |
| 5,786,112 A | 7/1998 | Okamoto et al. |

(Continued)

FOREIGN PATENT DOCUMENTS

| | | |
|---|---|---|
| KR | 101755758 B1 * | 7/2017 |
| WO | 2005078382 A1 | 8/2005 |
| WO | 2020152261 A1 | 7/2020 |

OTHER PUBLICATIONS

Enya et al., "Comparative Study of Manufacturing Techniques for Coronagraphic Binary Pupil Masks: Masks on Substrates and Free-Standing Masks", Publications of the Astronomical Society of Japan, Dec. 25, 2012, vol. 64, Issue 6, pp. 63-72.

(Continued)

*Primary Examiner* — Arnel C Lavarias (57) ABSTRACT

An embodiment of a phase mask includes a light blocking layer disposed on a substrate, where the light blocking layer has a number of optically transmissive regions each configured as a first pattern. The first pattern includes two segments that have different phase configurations from each other, and the light blocking layer includes at least three angular orientations of the first pattern.

21 Claims, 6 Drawing Sheets

(56) References Cited

U.S. PATENT DOCUMENTS

| | | | |
|---|---|---|---|
| 6,013,396 | A | 1/2000 | Capodieci |
| 6,139,994 | A | 10/2000 | Broeke et al. |
| 6,420,074 | B2 | 7/2002 | Wang et al. |
| 6,432,790 | B1 | 8/2002 | Okamoto et al. |
| 6,743,553 | B2 | 6/2004 | Shiota et al. |
| 6,924,893 | B2 | 8/2005 | Oldenbourg et al. |
| 7,754,394 | B2 | 7/2010 | Crawford et al. |
| 8,115,992 | B2 | 2/2012 | Brueck et al. |
| 8,537,461 | B2 * | 9/2013 | Schwertner ............ G02B 21/14 359/368 |
| 9,182,583 | B2 | 11/2015 | De Nooij et al. |
| 9,841,669 | B2 | 12/2017 | Park et al. |
| 9,885,859 | B2 | 2/2018 | Harris |
| 2002/0040892 | A1 | 4/2002 | Koyama et al. |
| 2005/0112476 | A1 | 5/2005 | Bellman et al. |
| 2011/0182529 | A1 | 7/2011 | Kempe et al. |
| 2018/0149961 | A1 | 5/2018 | Nozawa et al. |
| 2019/0391378 | A1 | 12/2019 | Eichelkraut et al. |
| 2020/0319446 | A1 | 10/2020 | Georgiadis et al. |

OTHER PUBLICATIONS

Liao et al., "Precision fabrication of an arrayed micro metal probe by the laser-LIGA process", Institute of Physics, Nov. 21, 2005, vol. 15, Issue 12, pp. 3433-2440.

Constntinescu et al., "Arrays of metallic micro-/nano-structures by means of colloidal lithography and laser dewetting", Applied Surface Science, Jun. 30, 2016, vol. 374, pp. 124-131.

Dyeret al, "157-nm laser micromachining of N-BK7 glass and replication for microcontact printing", Applied Physics A, Aug. 1, 2003, vol. 77, Issue No. 3, pp. 391-394.

International Search Report and Written Opinion dated Apr. 28, 2021, to PCT Application No. PCT/US2021/18202.

* cited by examiner

PHASE MASK FOR STRUCTURED ILLUMINATION

CROSS-REFERENCE TO RELATED APPLICATIONS

The present application claims the priority benefit from U.S. Patent Application Ser. No. 62/978,351, filed Feb. 19, 2019, which is hereby incorporated by reference herein in its entirety for all purposes.

FIELD OF THE INVENTION

The present invention is generally directed to a phase mask configured to generate fringe patterns for Structured Illumination Microscopy.

BACKGROUND

It is generally appreciated that Structured Illumination Microscopy (SIM) systems are available commercially on a variety of fluorescence microscopes. However, these SIM systems typically use "wide field" illumination. The term, "wide field illumination, as used herein, generally refers to the illumination of a large sample area by sending collimated light from a source through a focusing lens before entering an objective lens element. The normal intent of fluorescence imaging is not to collect an entire spectrum, but rather to simply filter the emission light for the wavelength of interest and then direct it into a camera. Typically, wide field microscopy is suitable in a variety of fluorescence imaging applications, but there are also cases in which a confocal microscope is superior. Confocal microscopes utilize a pinhole (also sometimes referred to as an aperture) to reject light that is out of focus, thereby vastly improving imaging and is particularly useful for imaging through thick samples. Since a confocal image is constructed pixel-by-pixel, rather than over a large area (as in wide field imaging), confocal microscopy is well adapted for spectroscopic imaging because the emission or scattered light can be sent into a spectrograph downstream of the pinhole. Specific uses for confocal microscopy include fluorescence sectioning through thick, non-homogenous samples, as well as hyperspectral imaging, such as in the case of imaging Raman microscopy.

An example of an application of SIM in a confocal microscope is described in U.S. application Ser. No. 16/837,512, titled "Enhanced Sample Imaging Using Structured Illumination Spectroscopy", filed Apr. 1, 2020, which is hereby incorporated by reference herein in its entirety for all purposes. For example, the '512 application describes scanning a sample point-by-point, multiple times using fringe patterns that take advantage of the fact that what is typically referred to as an interference fringe (e.g. a pattern of evenly spaced alternating bright and dark bands due to light being in our out of phase) can have a finer periodicity than a focused beam. The '512 application describes using what is referred to as a spatial light modulator (SLM) to generate the fringe patterns.

Those of ordinary skill in the art appreciate that embodiments of SLM's are well known and are capable of modulating both the intensity and phase of an illumination beam spatially, which is important for combined confocal-structured illumination microscopy applications. However, while an SLM is an excellent device for generating any arbitrary pattern of intensity and phase, it is generally a poor device to use in a commercialized product. For example, embodiments of SLM are generally prohibitively expensive, inefficiently utilize light power, and require a variety of complex optical and electronic overhead.

Therefore, a need exists for a device that is capable of spatially modulating the intensity and phase of an illumination beam, and does not suffer from the drawbacks of an SLM.

SUMMARY

Systems, methods, and products to address these and other needs are described herein with respect to illustrative, non-limiting, implementations. Various alternatives, modifications and equivalents are possible.

An embodiment of a phase mask is described that comprises a light blocking layer disposed on a substrate, where the light blocking layer has a number of optically transmissive regions each configured as a first pattern. The first pattern includes two segments that have different phase configurations from each other, and the light blocking layer includes at least three angular orientations of the first pattern.

In some implementations the substrate is constructed of optically transparent glass that may include BK7 glass. The optically transparent glass may also include an anti-reflective coating and the light blocking layer can include a layer of chrome disposed on the substrate. Further, the optically transmissive openings may be radially distributed on the substrate in some cases having six instances of the first pattern distributed around with two instances of the first pattern at each angular orientation.

Also, the two segments may be configured as a circular segment that, in some implementations can have a first side with an arc shape and a second side that with a substantially linear shape. The three angular orientations of the first pattern may include an angle of 0, pi/3, and 2pi/3. In addition, the phase configuration for a first segment may comprise a phase delay of zero and the phase configuration for a second segment may comprise a phase delay of pi, where the second segment may have a longer optical path length than the first segment. In some instances, this is accomplished having a coating of material in the second segment.

Further, an embodiment of confocal microscope is described that includes a light source configured to produce a light beam, and a phase mask. The phase mask has a light blocking layer disposed on a substrate, where the light blocking layer has with a number of optically transmissive regions each configured as a first pattern. The first pattern includes two segments that have different phase configurations from each other and the light blocking layer includes at least three angular orientations of the first pattern. The confocal microscope also includes a device operatively coupled to the phase mask that moves the phase mask to position the optically transmissive openings in a path of the light beam.

In some implementations, the optically transmissive openings include six instances of the first pattern, with two instances of the first pattern at each angular orientation. In some cases, the three angular orientations include an angle of 0, pi/3, and 2pi/3 and may include a phase configuration for a first segment that comprises a phase delay of zero and a phase configuration for a second segment that comprises a phase delay of pi. The phase configurations can include a second segment that has a longer optical path length than the first segment that in some cases some may be accomplished using a coating of material in the second segment.

Additionally, an embodiment of confocal microscope is described that includes a light source configured to produce a light beam, a detector configured to produce a signal in response to light from a sample, and a phase mask. The phase mask has a light blocking layer disposed on a substrate, where the light blocking layer has with a number of optically transmissive regions each configured as a first pattern. The first pattern includes two segments that have different phase configurations from each other and the light blocking layer includes at least three angular orientations of the first pattern. The confocal microscope also includes a device operatively coupled to the phase mask that moves the phase mask to position the optically transmissive openings in a path of the light from the sample.

In some implementations, the light from the sample is produced from an interaction of the light beam with the sample.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 110 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention include a phase mask configured to spatially modulate the intensity and phase of an illumination beam. More specifically, the Phase Mask is configured for SIM using a confocal microscope enabled for Raman Spectroscopy and/or Fluorescence Spectroscopy.

Figure 1:
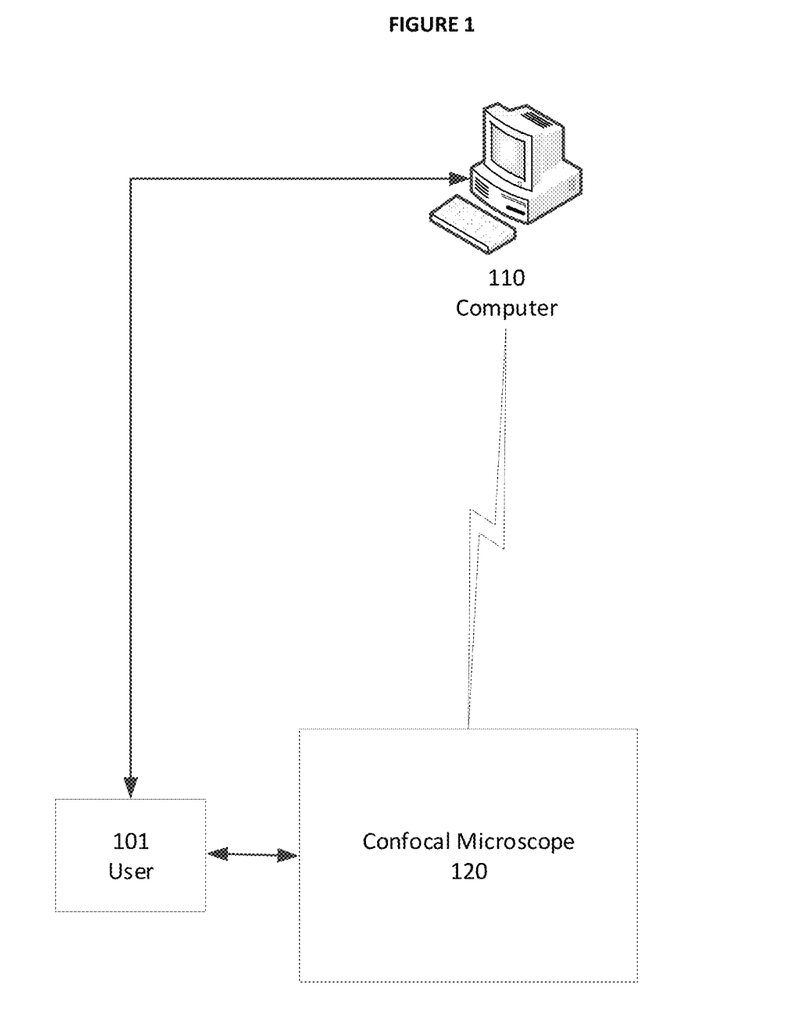
FIG. 1 is a functional block diagram of one embodiment of a confocal microscope in communication with a computer.

FIG. 1 provides a simplified illustrative example of user 101 capable of interacting with computer 110 and microscope 120. Embodiments of confocal microscope 120 may include a variety of commercially available microscopes. For example, confocal microscope 120 may include the DXR confocal enabled Raman microscopes available from Thermo Fisher Scientific. FIG. 1 also illustrates a network connection between computer 110 and confocal microscope 120, however it will be appreciated that FIG. 1 is intended to be exemplary and additional or fewer network connections may be included. Further, the network connection between the elements may include "direct" wired or wireless data transmission (e.g. as represented by the lightning bolt) as well as "indirect" communication via other devices (e.g. switches, routers, controllers, computers, etc.) and therefore the example of FIG. 1 should not be considered as limiting.

Computer 110 may include any type of computing platform such as a workstation, a personal computer, a tablet, a "smart phone", one or more servers, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (e.g. computer software program, including program code) stored therein. The control logic, when executed by a processor, causes the processor to perform some or all of the functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many types of networks well known to those of ordinary skill in the art. For example, a network may include a local or wide area network that may employ what is commonly referred to as a TCP/IP protocol suite to communicate. A network may include a worldwide system of interconnected computer networks that is commonly referred to as the internet, or could also include various intranet architectures. Those of ordinary skill in the related art will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

As described herein, embodiments of the described invention include a phase mask for SIM with a confocal microscope. In the described embodiments, the phase mask is particularly useful for Raman Spectroscopy and/or Fluorescence Spectroscopy using SIM. For example, as described above the phase mask has a substantially higher level of efficiency and lower cost than an SLM, as well as being easier to implement (e.g. the phase mask does not need the additional optical components and software required by the SLM in order to operate effectively).

Figure 2:
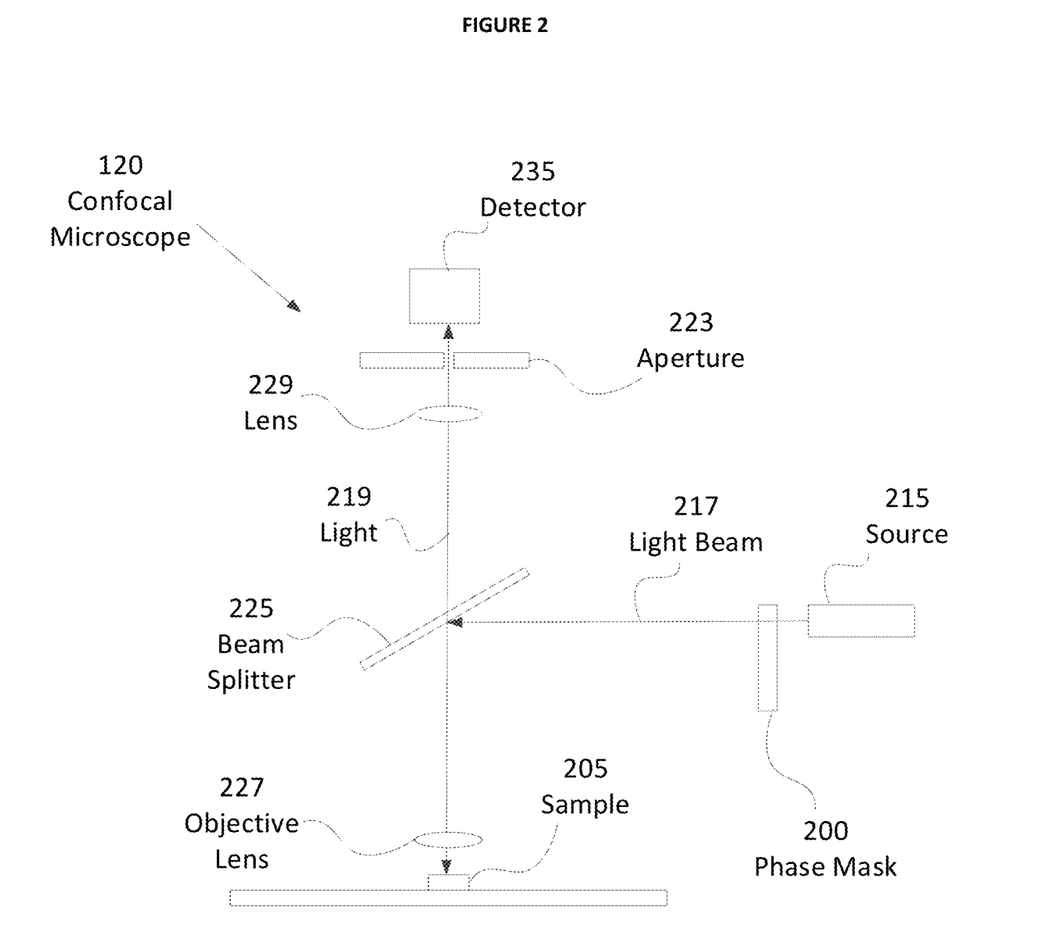
FIG. 2 is a simplified graphical representation of one embodiment of the confocal microscope of FIG. 1 with a phase mask.

FIG. 2 provides a simplified illustrative example of confocal microscope 120 that includes phase mask 200. Confocal microscope 120 includes elements typically found in commercially available confocal microscopes such as source 215 that produces light beam 217. Source 215 may include any type of light source used for confocal microscopy that includes, but is not limited to, a laser, Light emitting Diode (LED), broad band, or other type of source known to those of ordinary skill in the art. Embodiments of confocal microscope 120 may also include beam splitter 225 that selectively reflects light in a specified wavelength range to objective lens 227 and sample 205, and is transmissive within a specified wavelength range to allow light to pass through to lens 229 through aperture 223 (e.g. a "pinhole" type aperture) to detector 235. Detector 235 may include any type of detector typically found in commercially available confocal microscopes such as a CCD, photomultiplier, or other type of detector known to those of ordinary skill in the art. Those of ordinary skill in the related art will also appreciate that the FIG. 2 is provided for the purposes of example and that other elements and/or configurations of confocal microscope 120 are considered within the scope of the described invention. For example, prior to reaching detector 235 the light may first pass through a spectrograph to disperse the light into a spectrum.

In the example of FIG. 2, phase mask 200 is positioned in the path of light beam 217 to pattern the excitation light delivered to sample 205. However, it will also be appreciated that phase mask 200 can be positioned in the path of light 219 to pattern the light from sample 205 onto detector 235 (e.g. light that is emitted, scattered, etc. as a result of an interaction of light beam 217 with sample 205).

Figure 3:
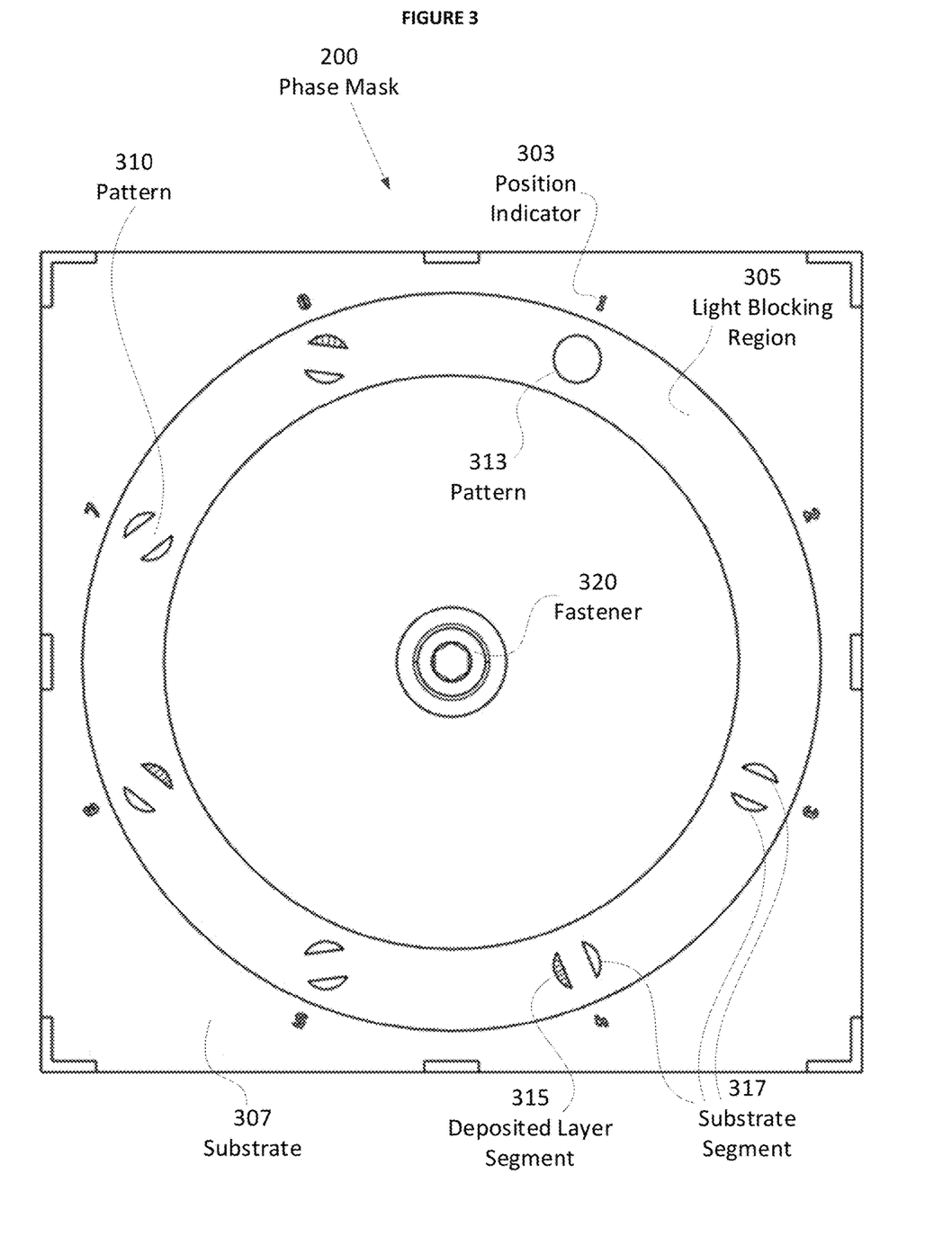
FIG. 3 is a simplified graphical representation of a top view of one embodiment of the phase mask of FIG. 2 illustrating a plurality of patterns in a light blocking layer on a substrate.

FIG. 3 provides an illustrative example of a top view of phase mask 200. Embodiments of phase mask 200 include substrate 307 constructed from an optically transmissive material with known optical characteristics. For example, substrate 307 may include a 60 mm×60 mm area constructed from a type of optical glass used in lenses and other optical components, such what is referred to as "crown glass" that has good optical and mechanical characteristics, and is resistant to chemical and environmental damage. One particular type of crown glass useful for phase mask 200 includes glass with a borosilicate additive, such as BK7 glass available from Schott AG.

As illustrated in FIG. 3, substrate 307 includes light blocking region 305 that may include any type of configuration capable of blocking the transmission of light through substrate 307. One example includes a configuration that comprises a deposition of a layer of chrome material on the surface of substrate 307 (e.g. may be the top surface or bottom surface). Also, FIG. 3 illustrates light blocking region 305 as a substantially circular ring, however it will be appreciated that the ring configuration is exemplary and other configurations may be utilized (e.g. a substantial portion the surface area of one side substrate 307 may include light blocking region 305, or light blocking region 305 may be configured as a linear strip).

Figure 4:
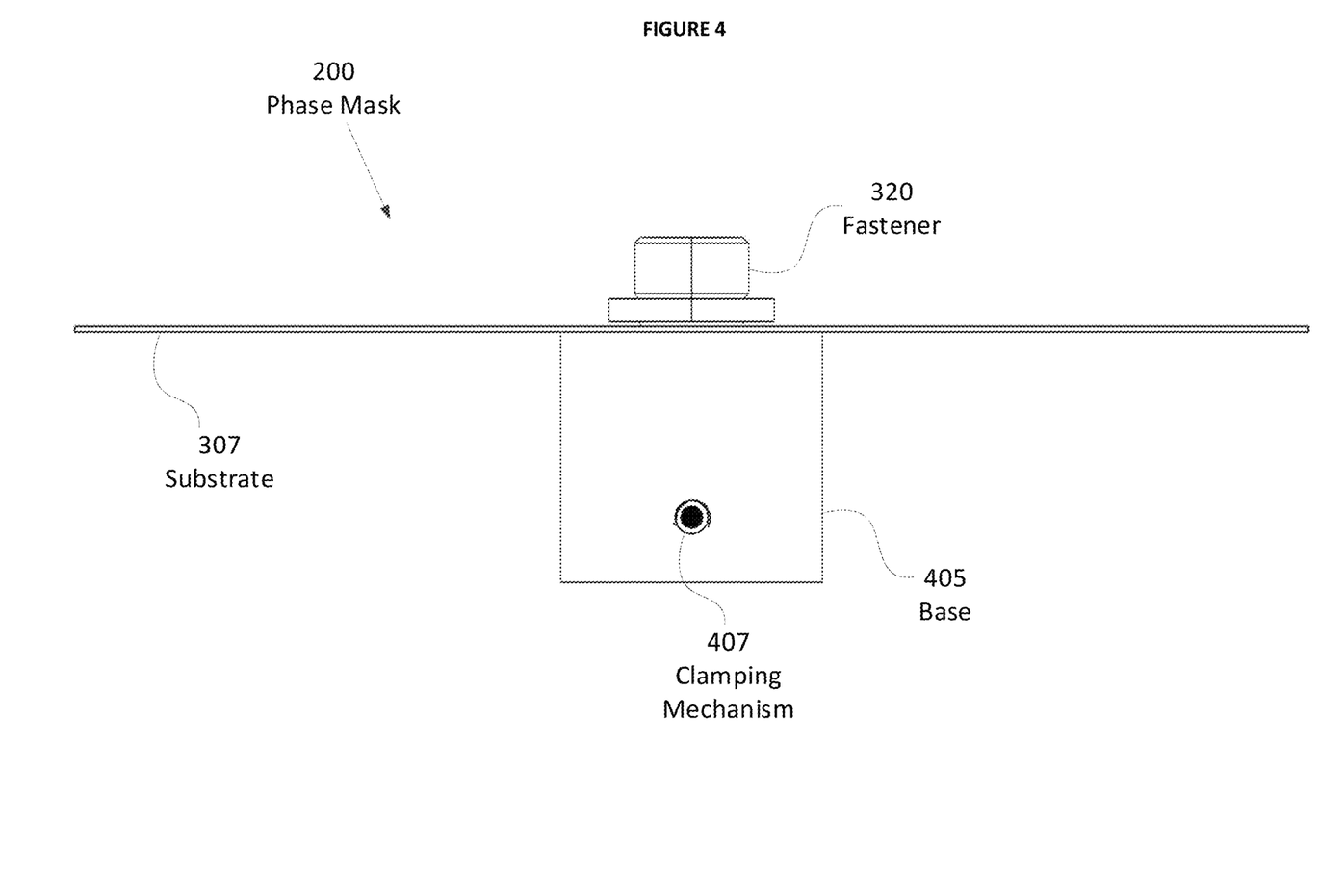
FIG. 4 is a simplified graphical representation of a side view of one embodiment of the phase mask of FIG. 3 illustrating a base and fastener that holds the substrate.

Further, FIG. 3 illustrates a plurality of optically transmissive regions in light blocking region 305, illustrated as pattern 310. As described above, the ring configuration of light blocking region 305 and the arrangement of each of patterns 310, as illustrated in FIG. 3, is exemplary and should not be considered as limiting. In some embodiments, pattern 310 may include a linear strip of light blocking region 310 or, as described above, may include a substantial portion the surface area of the surface of substrate 307 where the arrangement of patterns 310 may be substantially linear. For example, in the ring or linear configuration, pattern 310 may include a pattern covering region of about 4 mm×4 mm. For a linear embodiment this may include a linear configuration of light blocking region 305 comprising about 4 mm×24 mm FIG. 3 also illustrates fastener 320 that may include a nut/bolt configuration or any other fastener configuration known to those of ordinary skill in the art. FIG. 4 illustrates a side view of phase mask 200 that includes substrate 307 having a substantially planar configuration and substantially consistent thickness that is held in place by fastener 320 operatively coupled to base 405. In some embodiments, base 405 utilizes clamping mechanism 407 to operatively connect phase mask 200 to a translation device such as a motor that rotates phase mask 200 about the axis around fastener 320 (e.g. a stepper motor). In embodiments where phase mask 200 includes a linear arrangement of patterns 310, the translation device is constructed and arranged to provide linear motion to phase mask 200. It will also be appreciated that the translation device may include other types of elements known in the related art, such as a piezo, etc.

In addition, FIG. 3 illustrates 6 instances of pattern 310 at various angles relative to the optical path of light beam 217 (e.g. when the instance of pattern 310 is positioned in the optical path). Each instance of pattern 310 is at a location of light blocking region 305 indicated by position indicator 303. Light blocking region 305 also includes pattern 313 at a first position indicated by position indicator 303 that is substantially circular to permit substantially all of light beam 217 to pass through substrate 307, and a region without a light transmission pattern at position 2 indicated by position indicator 303 that blocks substantially all of light beam 217 from passing through substrate 307.

In some embodiments, phase mask 200 includes 3 angular orientations, where there are 2 instances of pattern 310 per angle one instance of pattern 310 that includes deposited layer segment 315 and substrate segment 317, as well as a second instance of pattern 310 that has two occurrences of substrate segment 317. Also, pattern 310 may include two segments arranged as "slit" shaped elements (e.g. a slit includes a long narrow opening), which may sometimes be referred to as "circular segments". Further, in some embodiments the diameter of the circular segments of pattern 310 are matched to the back-aperture diameter of objective lens 227. For example, for an Olympus 100×0.9 NA, that diameter would be >=3.24 mm, and for a long working distance Olympus 100×0.8 NA, that diameter would be >=2.88 mm. Also in the presently described example, one side of each circular segment may have an arc shape such as, for instance, a substantially circular shape (e.g. about ¼ of a circle), and a second side that is substantially linear.

Importantly, in some instances of pattern 310 there is an optical path length difference between the two segments of pattern 310. In other words, the segments have a different optical path length from each other that creates a phase difference in light passing through (e.g. the segment with a longer optical path length produces a phase delay in the portion of light beam 217 that passes through it relative to the segment with the shorter optical path length). In some embodiments, the optical path difference may be created using a deposition of additional material onto substrate 307 (e.g. substrate 307 comprises two substantially planar surfaces with consistent thickness) in one of the segments of pattern 310 to produce deposited layer segment 315 that combined with substrate 307 comprises the longer optical path when compared to substrate segment 317 of pattern 310 that only includes substrate 307. The deposited material may be the same material as substrate 307 or other suitable material. Alternatively, or in combination with the deposition, removal of material from substrate 307 in a segment may be used to shorten to optical path length of one of the segment of pattern 310.

For example, the refractive index difference between BK7 glass used for substrate 307 and air creates an optical path difference between the segments of pattern 310. Since the refractive index of BK7 glass is 1.52 at an excitation wavelength of 532 nm, light travels more slowly through BK7 than it does in air. Therefore, an optical path difference can be generated through controlled deposition of BK7 onto one of the segments. Those of ordinary skill in the art appreciate that where n is refractive index, and d is length, and if d1=d2 (e.g. the light travels the same distance in air as it does while it is traveling through the BK7), then the Optical Path Difference (OPD) is equal to n1*d−n2*d (may also be expressed as d=OPD/(n1−n2)). In the present example, n1 is 1.0003 for air and n2 is 1.52 for BK7 at an excitation wavelength of 532 nm (e.g. the values are wavelength dependent). For SIM applications a pi phase difference between the segments is highly desirable, which equates to an OPD of 266 nm for an excitation wavelength of 532 nm. Solving for d, a deposition of BK7 material at a thickness of 512 nm onto one of the segments produces the desired pi phase difference. Therefore, when portions of light beam 217 passes through substrate segment 317 and deposited layer segment 315 that includes a coating of 512 nm of BK7 glass, then the phase difference between the light traveling through segments 315 and 317 will be pi.

In the embodiment illustrated in FIG. 3, the 6 instances of pattern 310 include 3 different angles of 0, pi/3, and 2pi/3, where for each angle, pattern 310 includes substrate segment 317 with phase delay of 0 and deposited layer segment 315 with a phase delay of pi. In the described embodiments, the 6 instances of pattern 310 are useful for performing structured illumination by allowing light beam 217 to successively pass through each instance of pattern 310 as it is positioned in the optical path of light beam 217 (e.g. rotated into the optical path in the case of a circular arrangement as illustrated in FIG. 3, or linearly translated for a linear arrangement). For example, embodiments of confocal microscope 120 equipped with phase mask 200 and computer 110 to process the images, can implement SIM to image a sample and obtain a spatial resolution of 150 nm, that is a 2× improvement over the diffraction limit of 300 nm of a typical confocal microscope.

Figure 5:
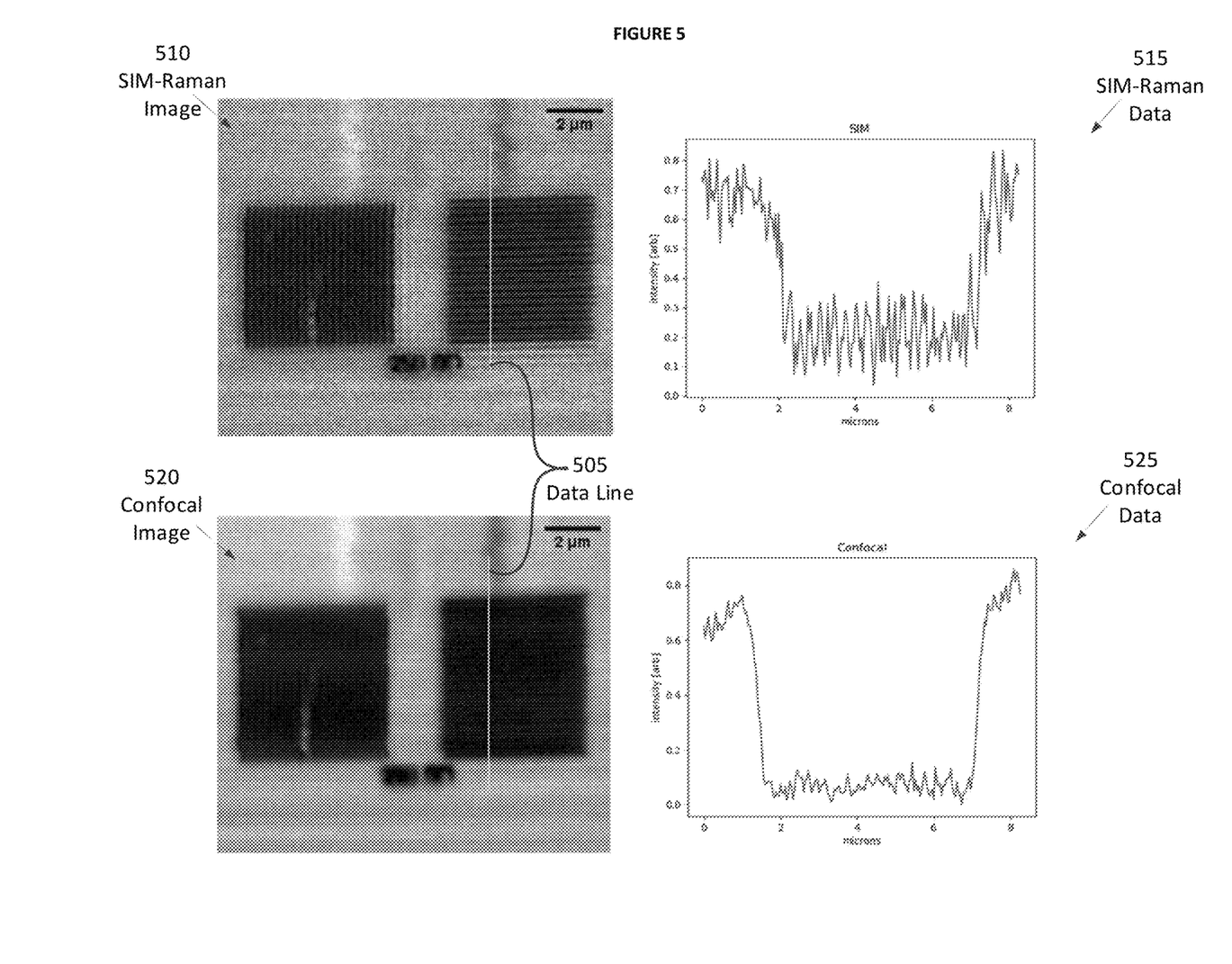
FIG. 5 is a simplified graphical representation of a comparison of an image collected using the phase mask of FIG. 3 to an image collected using a standard confocal arrangement.

FIG. 5 provides an illustrative example of a comparison of SIM-Raman image 510 and associated SIM-Raman data 515 collected using phase mask 200 and confocal image 520 and associated confocal data 525 collected using a standard confocal microscopy configuration, where both SIM-Raman image 510 and confocal image 520 have the same field of view of a substrate comprising an arrangement of vertical and horizontal lines separated by a 250 nm pitch. The example of FIG. 5 clearly demonstrates that upon visual inspection SIM-Raman image 510 has superior resolution to confocal image 520, which is further reinforced by SIM-Raman data 515 that illustrates superior intensity discrimination for data collected along data line 505 over confocal data 525.

Figure 6:
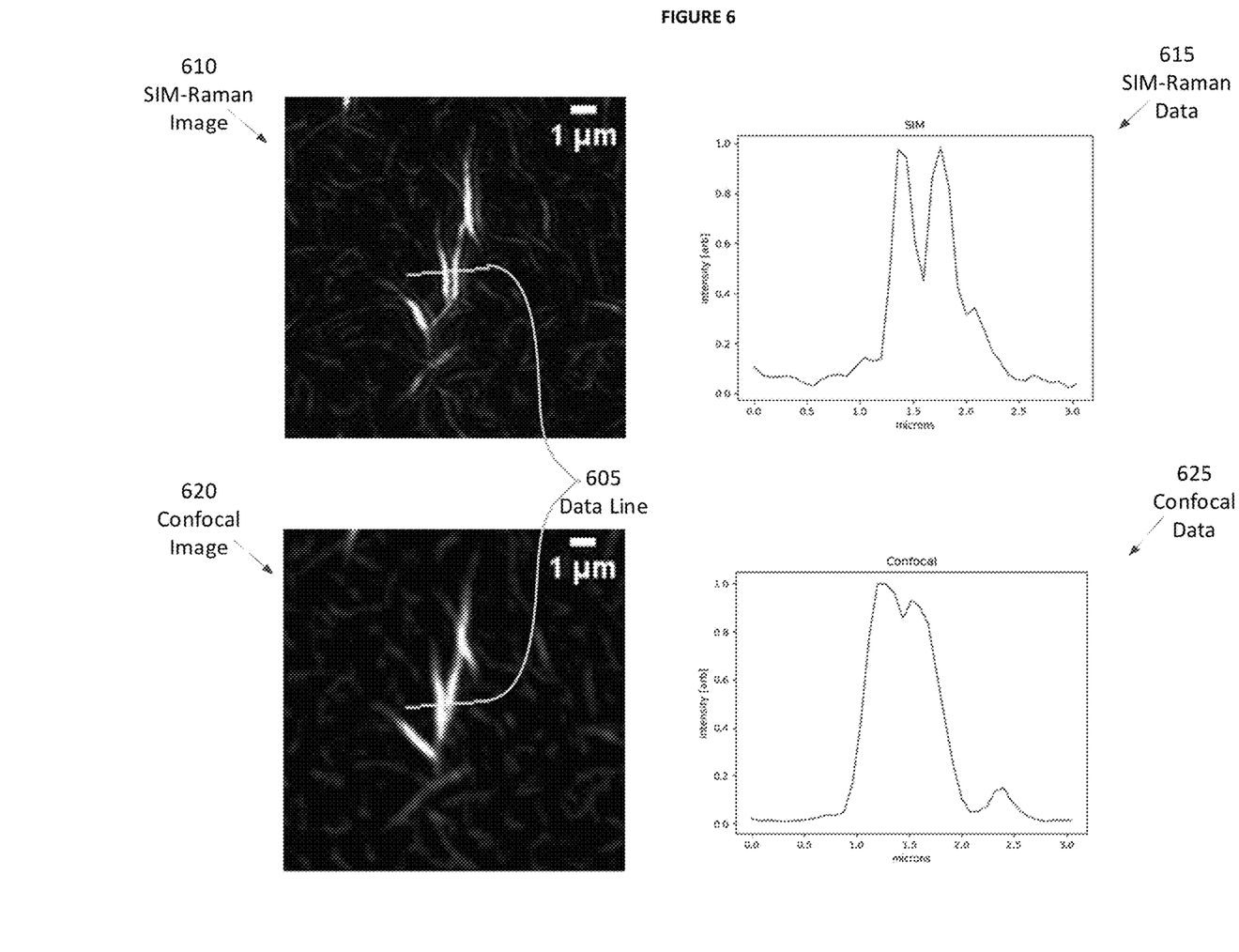
FIG. 6 is a simplified graphical representation of a comparison of an image collected using the phase mask of FIG. 3 to an image collected using a standard confocal arrangement.

FIG. 6 provides a further illustrative example of a comparison of SIM-Raman image 610 and associated SIM-Raman data 615 collected using phase mask 200 and confocal image 620 and associated confocal data 625 collected using a standard confocal microscopy configuration, where both SIM-Raman image 610 and confocal image 620 have the same field of view of a substrate comprising an arrangement of overlapping carbon nanotubes. Again, the example of FIG. 6 clearly demonstrates that upon visual inspection SIM-Raman image 610 has superior resolution to confocal image 620, which is further reinforced by SIM-Raman data 615 that illustrates superior intensity discrimination for data collected along data line 605 over confocal data 625 (e.g. SIM-Raman image 610 clearly resolves two separate carbon nanotubes, whereas confocal image 620 blurs the image of the two together except for the distal ends of the nanotubes).

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiment.

What is claimed is:
1. A phase mask, comprising:
a substrate; and
a light blocking layer disposed on the substrate with a plurality of optically transmissive regions each configured as a first pattern that includes two segments having different phase configurations, wherein the light blocking layer comprises three angular orientations of the first pattern, wherein the plurality of optically transmissive regions are radially distributed on the substrate.
2. The phase mask of claim 1, wherein:
the substrate comprises optically transparent glass.
3. The phase mask of claim 2, wherein:
the optically transparent glass comprises BK7 glass.
4. The phase mask of claim 2, wherein:
the optically transparent glass comprises an anti-reflective coating.
5. The phase mask of claim 1, wherein:
the light blocking layer comprises a layer of chrome disposed on the substrate.
6. The phase mask of claim 1, wherein:
the plurality of optically transmissive regions includes six instances of the first pattern.
7. The phase mask of claim 6, wherein:
the six instances comprise two instances of the first pattern at each angular orientation.
8. The phase mask of claim 1, wherein:
each of the two segments comprise a circular segment comprising a first side with an arc shape and a second side that comprises a substantially linear shape.
9. The phase mask of claim 1, wherein:
the three angular orientations include an angle of 0, pi/3, and 2pi/3.

10. The phase mask of claim 1, wherein:
the phase configuration for a first segment comprises a phase delay of zero and the phase configuration for a second segment comprises a phase delay of pi.

11. The phase mask of claim 10, wherein:
the second segment comprises a longer optical path length than the first segment.

12. The phase mask of claim 11, wherein:
the second segment comprises a coating of material.

13. A confocal microscope, comprising:
a light source configured to produce a light beam;
a phase mask that comprises:
   a substrate; and
   a light blocking layer disposed on the substrate with a plurality of optically transmissive regions each configured as a first pattern that includes two segments having different phase configurations, wherein the light blocking layer comprises three angular orientations of the first pattern relative to the light beam; and
a device operatively coupled to the phase mask and configured to move the phase mask to position the optically transmissive openings in a path of the light beam.

14. The confocal microscope of claim 13, wherein:
the plurality of optically transmissive openings includes six instances of the first pattern.

15. The confocal microscope of claim 14, wherein:
the six instances comprise two instances of the first pattern at each angular orientation.

16. The confocal microscope of claim 13, wherein:
the three angular orientations include an angle of 0, pi/3, and 2pi/3.

17. The confocal microscope of claim 13, wherein:
the phase configuration for a first segment comprises a phase delay of zero and the phase configuration for a second segment comprises a phase delay of pi.

18. The confocal microscope of claim 17, wherein:
the second segment comprises a longer optical path length than the first segment.

19. The confocal microscope of claim 18, wherein:
the second segment comprises a coating of material.

20. A confocal microscope, comprising:
a light source configured to produce a light beam;
a detector configured to produce a signal in response to light from a sample;
a phase mask that comprises:
   a substrate; and
   a light blocking layer disposed on the substrate with a plurality of optically transmissive regions each configured as a first pattern that includes two segments having different phase configurations, wherein the light blocking layer comprises three angular orientations of the first pattern relative to the light beam; and
a device operatively coupled to the phase mask and configured to move the phase mask to position the optically transmissive openings in a path of the light from the sample.

21. The confocal microscope of claim 20, wherein:
the light from the sample is produced from an interaction of the light beam with the sample.

* * * * *